May 5, 1959

R. L. LARSEN

SYMMETRICALLY OPERATING SERVOSYSTEM WITH UNSYMMETRICAL SERVOAMPLIFIER 2,885,612

Filed Jan. 2, 1957

2 Sheets-Sheet 1

INVENTOR.
ROY L. LARSEN
BY Arthur H. Swanson
ATTORNEY.

May 5, 1959

R. L. LARSEN

SYMMETRICALLY OPERATING SERVOSYSTEM WITH UNSYMMETRICAL SERVOAMPLIFIER 2,885,612

Filed Jan. 2, 1957

2 Sheets-Sheet 2

INVENTOR.
ROY L. LARSEN

BY Arthur H. Swanson

ATTORNEY.

United States Patent Office 2,885,612

Patented May 5, 1959

2,885,612

SYMMETRICALLY OPERATING SERVOSYSTEM WITH UNSYMMETRICAL SERVOAMPLIFIER

Roy L. Larsen, Norwood, Mass., assignor to Minneapolis-Honeywell Regulator Company, Minneapolis, Minn., a corporation of Delaware Application January 2, 1957, Serial No. 632,166

11 Claims. (Cl. 318—28)

Figure 1:
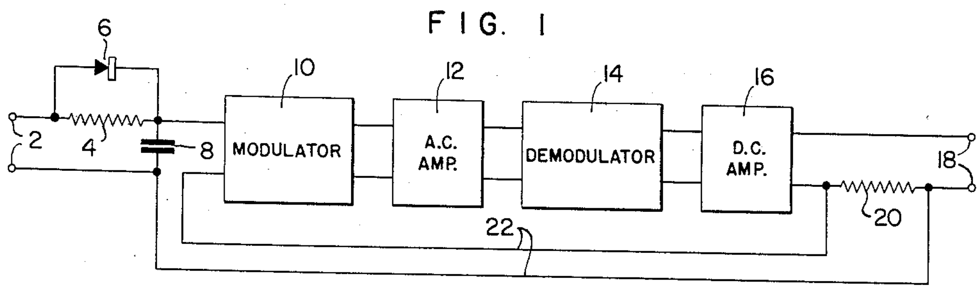

This invention relates to electrical signal translating arrangements, and more particularly to means for compensating for polarity sensitive asymmetries occurring therein.

In the art relating to signal translating apparatus particularly when the signals to be translated are direct current signals, the signal translating apparatus is frequently sensitive to the polarity of the input signal to the extent that the output signal is not symmetrical with respect to the occurrence of positive and negative input signals. For example, when a D.C. amplifier is used to amplify the direct current signals and that amplifier comprises a magnetic amplifier, the hysteresis in the amplifier causes an asymmetry in the output. Again, when a direct current signal is applied through a modulator and amplifier to drive a two phase servo motor the inherent deviation from true phase quadrature produces an asymmetry in the response of the motor, depending upon the polarity of the input signal.

It is accordingly an object of the present invention to provide an improved electrical signal translating apparatus which obviates the foregoing difficulties.

It is another object of this invention to provide an improved electrical signal translating apparatus which features novel means for correcting inherent asymmetries.

It is still another object of this present invention to provide an improved electrical signal translating apparatus which features means for compensating for asymmetries introduced into the apparatus by operation of elements thereof which are responsive to the polarity of an input signal.

It is a further object of this invention to provide an improved direct current electrical signal translating apparatus wherein means are provided for compensating for asymmetries in the output of the apparatus, which asymmetries are introduced by certain elements of the apparatus which are responsive to the polarity of applied direct current signals.

Yet another object of this invention is to provide an improved direct current electrical signal translating apparatus as set forth wherein the element responsive to the polarity of the applied signal comprises a magnetic direct current amplifier.

A still further object of this invention is to provide a direct current electrical signal translating apparatus as set forth wherein the element responsive to the polarity of the applied direct current signal comprises a two phase servo motor.

In accomplishing these and other objects, there has been provided, in accordance with the present invention, a direct current signal translating circuit where nonlinear impedance elements have been inserted. These non-linear impedance elements are so arranged that an input signal of one polarity is met with an impedance of one value while an input signal of the opposite polarity is met with an impedance of a different value. The different impedance values are so chosen that the asymmetries which would have appeared in the output of the circuit are compensated for, rendering the output of the apparatus symmetrical with respect to positive and negative input signals.

Figure 2:
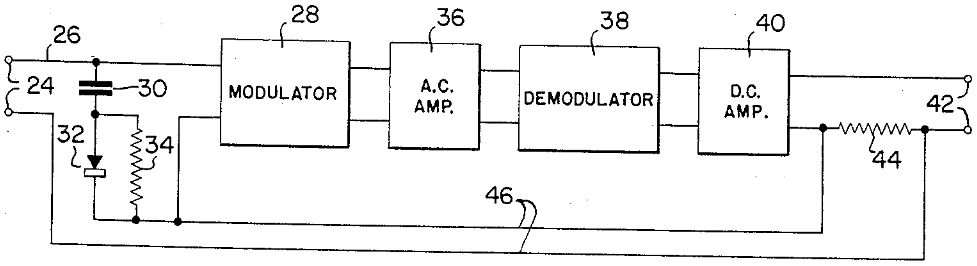
Figure 4:
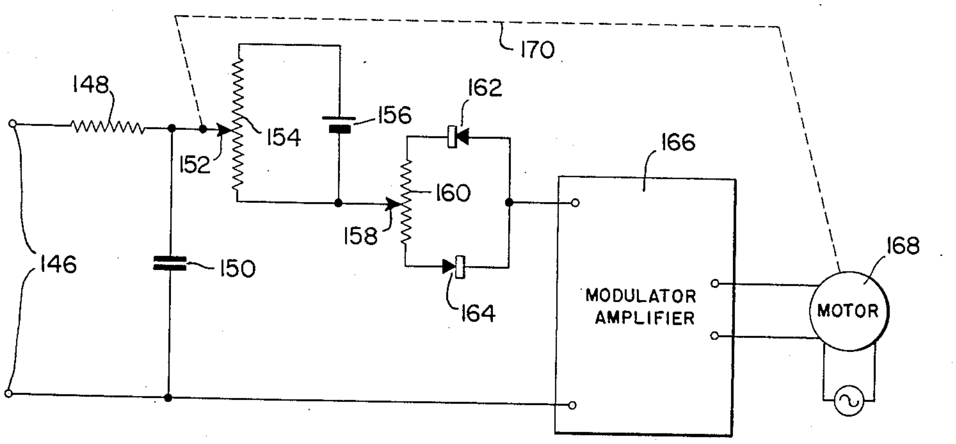
Figure 3:
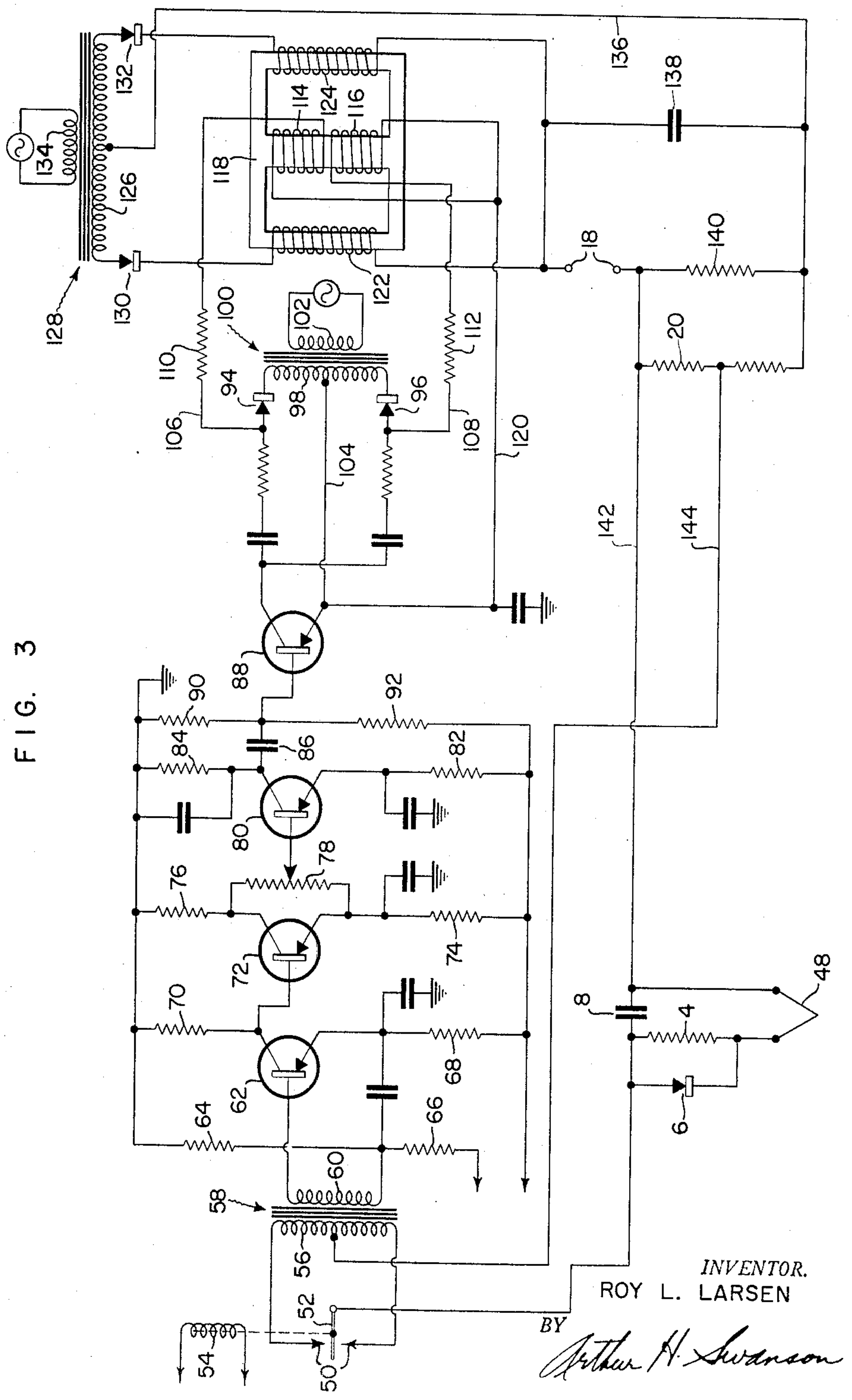

A better understanding of this invention may be had from the following detailed description when read in connection with the accompanying drawings in which:

Figure 1 is a schematic block diagram of a millivolt to current transducer which embodies the present invention, Figure 2 is also a schematic block diagram of a millivolt to current transducer which embodies the present invention but in a different circuit arrangement, Figure 3 is a schematic circuit diagram of a millivolt to current transducer showing details of the block diagram illustrated in Figure 1; and Figure 4 is a schematic representation of a null balance potentiometer which also embodies the present invention.

Referring now to the drawings in more detail, in Figure 1 there is shown a pair of input terminals 2 to which may be secured a suitable source of direct voltage signals. The input signals are fed from the terminals 2 through a network which includes a series resistor 4 which is shunted by a diode 6. A capacitor 8 across the leads completes the network. From this network the signal is fed to a signal modifying modulator which may well comprise means for converting the direct voltage signal into an alternating voltage signal. The output of the modulator 10 is fed to an alternating current amplifier 12. The output of the A.C. amplifier 12 is fed to a demodulator 14 where the alternating signal from the A.C. amplifier is converted into a direct current signal the amplitude and polarity of which are dependent upon the nature of the original input signal applied to the terminals 2. This demodulated signal may then be applied to a direct current amplifier 16. The output circuit of the D.C. amplifier 16 includes a pair of output terminals 18 and a feedback resistor 20. The signal developed across the feedback resistor 20 is fed back through leads 22 to the input of the modulator 10 to stabilize the operation of the circuit.

As was previously noted if the D.C. amplifier particularly happens to be a magnetic amplifier arrangement, it will be found that the amplifier is sensitive not only to the polarity of the signal applied thereto but also to the direction of change in a signal. That is, it will also be sensitive to produce different results if the signal is increasing from the results obtained when the signal is decreasing. It has been found that the effect of this difference in response characteristic with respect to the polarity or direction of change of the applied signal is the same as would be expected if the circuit impedances were different for the different classes of applied signals. In fact, this appears to be the case. Accordingly, in order to provide a circuit wherein the response characteristic is symmetrical, irrespective of the direction of the change in the applied signal or its polarity, means are provided for inserting a non-symmetrical impedance arrangement into the circuit. Referring back to the input of the modulator 10 we see that the series resistor 4 is provided with a shunt path therearound which includes the diode 6. The diode 6 is characterized in that in one direction it presents a very low impedance to the passage of signals therethrough while in the opposite direction the impedance presented is relatively very high. With the diode connected in parallel with the resistor 4, signals having one sense, which corresponds to the forward direction of the diode, see a very low impedance since the impedance of the diode is low with respect to that of the resistor 4. On the other hand, if the signals are of opposite sense, then the diode presents a high impedance with respect to the impedance of the resistor 4 and the input signals see substantially the impedance of the resistor 4. This shift in the input impedance is sufficient to compensate for the corresponding shift which would appear in the output of the D.C. amplifier 16.

The arrangement of the network in the input circuit with the capacitor 8 lying across the input terminals also constitutes a filter for the input signals. For many applications such a filter is highly desirable. On the other hand, for other applications the filter may introduce intolerable signal delays. In Figure 2 there is shown a circuit wherein the compensating non-linearity is introduced to the input of the modulator but does not constitute a filter for the input signals.

The structure shown in Figure 2 is essentially similar to that shown in Figure 1 wherein a pair of input terminals 24 are provided for connection to a source of variable direct voltage signals. The other one of these terminals 24 is connected by lead 26 directly to the signal modulator 28. A linearizing network is connected directly across the input terminals of the modulator 28. This network includes a capacitor 30, a diode 32 connected in series with the capacitor and a resistor 34 connected in shunt with the diode 32. The output of the modulator 28, which may again be means for converting the direct voltage signal into an alternating voltage signal, is applied to an A.C. amplifier 36. The output of the A.C. amplifier is reconverted to a direct current signal in a demodulator 38 and applied to the direct current amplifier 40. The output circuit of the D.C. amplifier 40 includes a pair of output terminals 42 and a feedback resistor 44. The signal developed across the feedback resistor 44 is fed back through a pair of leads 46 to the input of the modulator 28 and to the other input terminal 24.

The appearance of the linearizing network, which includes the capacitor 30, the diode 32, and a shunt resistor 34 across the input terminals of the modulator 28, again provide means for varying the circuit impedance in accordance with the direction of the change of the input signal applied to the terminals 24. However, since the network is not serially connected with the input circuit, the signal delay aspect which was present in the circuit illustrated in Fig. 1 is not present in the circuit illustrated in Fig. 2. Thus, in instances where it is necessary to have the very fast response, the selective impedance network may be connected in shunt with the input to the modulator as shown in Fig. 2.

In Figure 3 there is shown, schematically, a particular circuit embodying the invention in the manner shown in Figure 1, but showing certain circuit details. The source of direct voltage signals is represented as a thermopile 48 which is connected to the input terminals 2. The modulator 10 includes the signal chopper having a pair of relatively fixed contact elements 50 between which a movable contact element 52 is positioned. The movable contact element 52 is actuated to engage alternately one or the other of the fixed contact elements 50 by an operating coil 54 which is, in turn, energized by a suitable source of alternating current, not shown. Between the input terminals 2 and the movable contact element 52 there is the linearizing or compensating impedance network which includes diode 6, shunted by the resistor 4 serially connected in the line, and the capacitor 8 connected across the input means.

The two fixed contact elements 50 are connected to opposite ends of the primary winding 56 of a coupling transformer 58. The secondary 60 of the transformer 58 has one end thereof connected to the base electrode of a semi-conductor amplifier device 12, such devices being hereinafter referred to as transistors. The other end of the secondary is connected through a suitable bias energy divider comprising a pair of serially connected resistors 64 and 66, to a suitable source of bias energy, not shown. The emitter electrode of the transistor 62 is connected, through a biasing resistor 68, to another suitable source of biasing energy, not shown. The collector electrode of the transistor 62 is connected through a suitable load resistor 70 to ground. The output of this first mentioned transistor is directly coupled to the base electrode of a second transistor 72. As before, the emitter electrode of this transistor is coupled through the bias resistor 74 to the same source of bias energy as that to which the emitter of the first transistor was connected. Similarly, the collector electrode is connected through a load resistor 76 to ground. A gain control potentiometer resistor 78 is connected between the emitter electrode and the collector electrode of the transistor 72. The movable tap of this potentiometer is connected to the base electrode of a third transistor 80. This transistor also is provided with a bias resistor 82 in its emitter circuit and a load resistor 84 in its collector electrode circuit. The output of this transistor is capacity coupled through a coupling capacitor 86 to the input of a power or driver transistor stage 88. A separate bias connection is provided for the base electrode of the transistor 88 through a pair of serially connected resistors 90 and 92, connected between ground and the source of bias energy to which reference was previously made. The junction of these two resistors is connected to the base electrode to provide the bias therefor. The output of the driver is applied to the input of a signal demodulator 14.

The demodulator 14 comprises a pair of diodes 94 and 96 to one electrode of each of which the signal is applied from the collector electrode of the transistor 88 through suitable filters. The opposite electrodes of the diodes 94 and 96 are connected to opposite ends of the secondary winding 98 of a transformer 100. The primary winding 102 of the transformer is coupled to a source of alternating current which is of the same phase and frequency as that to which the coil 54 of the chopper modulator 10 is connected. In fact, the input to the coil 54 and the winding 98 may both be separate secondary windings on the same power transformer. The secondary winding 98 is center-tapped and coupled through a lead 104 to the emitter electrode of the transistor 88, completing the output circuit of that transistor.

The output of the demodulator 14 is fed through leads 106 and 108 and load resistors 110 and 112 to the control windings 114 and 116 on the center leg of the magnetic amplifier core 118.

The net effective output of the demodulator is a direct current signal the magnitude of which is a function of the magnitude of the input signal. The effective polarity of demodulator output signal is a function of the direction of change of the input signal. This signal is applied to the two control windings 114 and 116 of the magnetic amplifier 118 and returned in a common return lead 120 to the emitter electrode of the transistor 88. In this case, it will be noted that the term net effective output of the demodulator refers to the resultant effect of the two control windings on the magnetic amplifier. Although the signal in each half of the demodulator output circuit never changes polarity, of itself, the signals in the two halves of the output circuit are differentially applied to the two control windings, producing a net effect as if the polarity of the output signal were reversible. The magnetic amplifier 118 is excited by energizing windings 122 and 124. These windings are fed from the secondary 126 of transformer 128 through a pair of rectifying diodes 130 and 132. This transformer is energized from a source of current applied to its primary 134 which is of the same phase and frequency as the current applied to the primary of the transformer 100. Here too, the secondary 126 may be a separate secondary winding on the same power transformer as was the secondary of the transformer 100. The secondary 126 of the transformer 128 is center-tapped by a lead 136 which supplies, through a suitable filter including a capacitor 138 and resistor 140, a common return path for the windings 122 and 124 of the magnetic amplifier 118. This latter circuit also includes the output terminals 18. A portion of the output voltage signal which is developed across the feedback resistor 20 is fed back over leads 142 and 144 to the input of the amplifier.

When there is no signal applied to the control windings 114 or 116 of the magnetic amplifier 118, the signals applied to the energizing windings 122 and 124 sum to zero in the output circuit. However, when a control signal is applied to the control windings 114 and 116 indicative of an applied signal from the voltage source 48, the magnetic amplifier is unbalanced and an output signal appears across the terminals 18. The magnitude of the output signal will, of course, be determined by the magnitude of the signal applied to the control windings 114 and 116 of the magnetic amplifier 118. As was previously mentioned, due to inherent hysteresis of the core material of the magnetic amplifier 118 the response characteristic of the apparatus is not symmetrical with respect to positive and negative signals applied thereto. This asymmetry appears as an unbalanced impedance in the amplifier. Accordingly, to compensate for this asymmetry the linearizing or compensating impedance network which includes the resistor 4, the shunt diode 6 and the capacitor 8 are inserted in the input circuit, thus introducing an asymmetrical impedance which compensates for the otherwise apparent asymmetry in the output circuits.

In Figure 4, there is shown a somewhat different structure also embodying the present invention. In Figure 4, there is represented a self balancing potentiometer type instrument. This includes a pair of input terminals 146 and a filter comprising the resistor 148 and the capacitor 150. The input voltage signal is applied to the movable tap 152 on a slide wire 154. The slide wire 154 is energized from a suitable direct potential source here represented by the battery 156. In apparatus of this type the input signals applied to the terminals 146 are applied in opposition to the voltage developed across the slide wire resistor 154. The movable tap 152 of the slide wire is then adjusted until the two signals balance or sum to zero. The position of the movable tap then indicates the magnitude of the applied signals relative to that developed across the total slide wire resistor by the battery 156. An output circuit for the slide wire is provided and includes the movable tap 158 on a further slide wire 160. The opposite ends of the slide wire 160 are connected through a pair of oppositely poled diodes 162 and 164 to the input of the modulator amplifier 166. The output from the modulator amplifier 166 is applied to the input of the slide wire rebalancing motor 168. The motor 168 is coupled through a suitable mechanical coupling represented by the dotted line 170 to the movable tap 152 on the main slide wire 154.

The modulator amplifier as well as the motor may well be of the type shown in the patent issued to W. P. Wills, No. 2,423,540. In accordance with the teachings of that patent, the direct current signal from the slide wire, indicative of a state of unbalance therein, is applied to a chopper modulator wherein the D.C. signal is converted to an A.C. signal. This A.C. signal is then amplified in an A.C. amplifier. The output of the A.C. amplifier is applied as control current to one pair of poles of a four-poled reversible electric motor. The other two poles of the motor are energized from a standard source of alternating current which is of the same frequency as the energy driving the signal chopper but displaced in phase 90° therefrom. The modulator amplifier is characterized in that its output signal is shifted by approximately 180° phase-wise, depending upon the polarity of the unbalanced signal applied thereto. This shift in phase causes the motor to be operated in one direction or the other depending upon which phase is prevalent, since the standard signal applied to the other poles of the motor is in substantial phase quadrature with the control signals. However, since an absolute 90° phase shift for the quadrature current is substantially impossible to obtain, there will appear a slight variation in the response characteristic of the motor in one direction as compared to its operation in the opposite direction. The operational effect of this difference in response characteristics is as if there were a different line impedance on the input to the motor for signals of one phase characteristic than there is for signals of the opposite phase characteristic. Accordingly, by injecting a suitable selective impedance in the line this difference in response characteristic in the motor may be neutralized. This is the function of the second slide wire 160 and the associated oppositely poled diodes 162 and 164.

In operation, we may assume that a particular voltage signal was applied to the input terminals 146 and this had been balanced in the slide wire 154 by operation of the motor, and the system then stands at balance. However, assume a change occurs in the voltage signal applied to the terminals 146. This causes an unbalanced signal to be applied to the slide wire movable tap 158. Since the slide wire assembly 154 provides a balancing action, an increasing signal on the input terminals 146 will cause an output signal on the movable tap 158 of one polarity while a decreasing signal on the terminals 146 will produce on the movable tap 158 a signal of opposite polarity. Since the two diodes 162 and 164 are oppositely poled with respect to the input signal, the signals of one polarity will be effectively passed by the diode 162 while signals of the opposite polarity will be effectively passed by the diode 164.

If, under these conditions, the movable tap 158 in operation on the slide wire 160 were positioned at the effective center of slide wire 160 there would be no difference in the impedance in the input to the modulator amplifier with respect to the different polarities of the input signals. However, it may be seen that by moving the movable tap 158 in one direction or the other, the slide wire resistance is effectively divided into two unequal resistances. One of these two unequal resistances will be injected into the input path of the unbalance signals when the signal is of one polarity while the other of the two unequal resistances will be injected into the input path of the signal when of the opposite polarity. In this manner, the movable tap 158 and slide wire 160 may be manually adjusted until the response characteristic of the motor is neutralized with respect to differences in direction of operation. In this manner, there has been provided a means for making a polarity sensitive impedance difference in the circuit supplying the motor. This causes the motor effectively to be identical in characteristic irrespective of the direction of operation.

Thus it may be seen that there has been provided, in accordance with the present invention, an improved electrical signal translating apparatus which includes means compensating for inherent asymmetries which are introduced into the system by the response characteristics of certain of the elements thereof which are differently responsive to the opposing polarities of the input signal.

What is claimed is:

1. A direct current electric signal translating apparatus comprising a signal input means, a signal translating circuit coupled to said signal input means, output means coupled to said signal translating means, said output means being characterized by an asymmetrical response with respect to applied signals of opposite polarity, and asymmetrical compensating impedance means coupled between said input means and said circuit for neutralizing the effect of said asymmetrical response characteristic of said output means.

2. A direct current electric signal translating apparatus comprising a voltage signal input means, a signal translating and amplifying circuit coupled to said signal input means, output means coupled to said signal translating and amplifying means, said output means being characterized by an asymmetrical response with respect to applied signals of opposite polarity, and asymmetrical compensating impedance means coupled between said signal input means and said translating and amplifying circuit for neutralizing the effect of said asymmetrical response characteristic of said output means.

3. A direct current electric signal translating apparatus comprising a direct voltage signal input means for applying voltage signals of variable magnitude and polarity, a signal translating and amplifying circuit including means for converting signals from said input means to corresponding alternating signals, amplifying means coupled to said converting means for ampilfying said alternating signals, output means responsive to said amplified alternating signals, said output means being characterized by an asymmetrical response with respect to input signals of opposite polarity, and asymmetrical compensating impedance means coupled between said signal input means and said circuit for neutralizing the effect of said asymmetrical response characteristic of said output means.

4. A direct current electric signal translating apparatus comprising a direct voltage signal input means for applying voltage signals of variable magnitude and polarity, a signal translating and amplifying circuit including means for converting signals from said input means into corresponding alternating signals and amplifying means coupled to said converting means for amplifying said alternating signals, output means responsive to said amplified alternating signals, said output means comprising a reversible alternating current motor, said motor being characterized by an asymmetrical response with respect to input signals of opposite polarity, and asymmetrical compensating impedance means coupled between said signal input means and said circuit for neutralizing the effect of said asymmetrical response characteristic of said motor.

5. A direct current electric signal translating apparatus comprising a direct voltage signal input means for applying voltage signals of variable magnitude and polarity, a signal translating and amplifying circuit including means for converting signals from said input means into corresponding alternating signals and amplifying means coupled to said converting means for amplifying said alternating signals, output means responsive to said amplified alternating signals, said output means comprising a reversible alternating current motor, said motor being characterized by an asymmetrical response with respect to input signals of opposite polarity, and asymmetrical compensating impedance means coupled to said circuit for neutralizing the effect of said asymmetrical response characteristic of said motor, said compensating means comprising a first and a second impedance path connected in shunt with each other, signal polarity responsive means for rendering one or the other of said impedance paths primarily effective.

6. A direct current electric signal translating apparatus comprising a direct voltage signal input means for applying voltage signals of variable magnitude and polarity, a signal translating and amplifying circuit including means for converting signals from said input means into corresponding alternating signals and amplifying means for amplifying said alternating signals, output means responsive to said amplified alternating signals, said output means comprising a reversible alternating current motor, said motor being characterized by an asymmetrical response with respect to input signals of opposite polarity, and asymmetrical compensating impedance means coupled to said circuit for neutralizing the effect of said asymmetrical response characteristic of said motor, said compensating means comprising a slide wire resistor having a movable tap input, a first diode connected to one terminal of said slide wire, a second diode connected to the opposite terminal of said slide wire, said diodes being connected to pass signals of opposite polarity whereby signals of one polarity will be passed through the resistance of one end of said slide wire which signals of opposite polarity will be passed through the resistance of the opposite end of said slide wire.

7. A direct current electric signal translating apparatus comprising a direct voltage signal input means for applying signals of variable magnitude and polarity, a signal translating and amplifying circuit including means for converting signals from said input means into corresponding alternating signals and amplifying means coupled to said converting means for amplifying said alternating signals, output means responsive to said amplified alternating signals, said output means comprising means for reconverting said amplified alternating signals into a direct signal whose magnitude and polarity are functions of the original input signal and a magnetic amplifier device whose output is a direct current signal which is a function of said reconverted signals, said magnetic amplifier device being characterized by an asymmetrical response with respect to input signals of opposite polarity, and asymmetrical compensating impedance means coupled between said signal input means and said circuit for neutralizing the effect of said asymmetrical response characteristic of said magnetic amplifier device.

8. A direct current electric signal translating apparatus comprising a direct voltage signal input means for applying signals of variable magnitude and polarity, a signal translating and amplifying circuit including means for converting signals from said input means into corresponding alternating signals and amplifying means for amplifying said alternating signals, output means responsive to said amplified alternating signals, said output means comprising means for reconverting said amplified alternating signals into a direct signal whose magnitude and polarity are functions of the original input signal and a magnetic amplifier device whose output is a function of said reconverted signals, said magnetic amplifier device being characterized by an asymmetrical response with respect to input signals of opposite polarity, and asymmetrical compensating impedance means coupled to said circuit for neutralizing the effect of said asymmetrical response characteristic of said magnetic amplifier device, said compensating means comprising a first and second impedance path connected in shunt with each other, and signal polarity responsive means for rendering one or the other of said paths primarily effective 9. A direct current electric signal translating apparatus comprising a direct voltage signal input means for applying signals of variable magnitude and polarity, a signal translating amplifying circuit including means for converting signals from said input means into corresponding alternating signals and amplifying means coupled to said converting means for amplifying said alternating signals, output means responsive to said amplified alternating signals, said output means comprising means for reconverting said amplified alternating signals into a direct signal whose magnitude and polarity are functions of the original input signal and a magnetic amplifier device whose output is a direct current signal which is a function of said reconverted signals, said magnetic amplifier device being characterized by an asymmetrical response with respect to input signals of opposite polarity, and asymmetrical compensating impedance means coupled to said circuit for neutralizing the effect of said asymmetrical response characteristic of said magnetic amplifier device, said asymmetrical compensating means comprising a diode and a resistor connected in shunt with each other to provide a pair of alternate impedance paths for signals from said input means, said diode providing an impedance path of primary effect for signals of one polarity and said shunt resistor providing an impedance path of primary effect for signals of the opposite polarity.

10. A direct current electric signal translating apparatus comprising a direct voltage signal input means for applying signals of variable magnitude and polarity, a signal translating and amplifying circuit including means for converting signals from said input means into corresponding alternating signals and amplifying means coupled to said converting means for amplifying said alternating signals, output means responsive to said amplified alternating signals, said output means comprising means for reconverting said amplified alternating signals into a direct signal whose magnitude and polarity are functions of the original input signal and a magnetic amplifier device whose output is a direct current signal which is a function of said reconverted signals, said magnetic amplifier device being characterized by an asymmetrical response with respect to input signals of opposite polarity, and asymmetrical compensating impedance means coupled to said circuit for neutralizing the effect of said asymmetrical response characteristic of said magnetic amplifier device, said asymmetrical compensating impedance means comprising a diode and a resistor connected in shunt with each other to provide a pair of alternate impedance paths for signals from said input means, said impedance means being connected serially with respect to the signal input path to said signal translating and amplifying circuit, and a capacitor connected in shunt with respect to the signal input path to said signal translating and amplifying circuit.

11. A direct current electric signal translating apparatus comprising a direct voltage signal input means for applying signals of variable magnitude and polarity, a signal translating and amplifying circuit including means for converting signals from said input means into corresponding alternating signals and amplifying means coupled to said converting means for amplifying said alternating signals, output means responsive to said amplified alternating signals, said output means comprising means for reconverting said amplified alternating signals into a direct signal whose magnitude and polarity are functions of the original input signal and a magnetic amplifier device whose output is a direct current signal which is a function of said reconverted signals, said magnetic amplifier device being characterized by an asymmetrical response with respect to input signals of opposite polarity, and asymmetrical compensating impedance means coupled to said circuit for neutralizing the effect of said asymmetrical response characteristic of said magnetic amplifier device, said asymmetrical compensating impedance means comprising a capacitor, a diode and a resistor, said diode being connected in series with said capacitor and in shunt with said resistor, said impedance means being connected in shunt with respect to the signal input path to said signal translating and amplifying circuit.

References Cited in the file of this patent

UNITED STATES PATENTS

| | | |
|---|---|---|
| 1,692,904 | Potter | Nov. 27, 1928 |
| 2,383,710 | Chatterjea et al. | Aug. 28, 1945 |
| 2,459,177 | Moseley et al. | Jan. 18, 1949 |
| 2,508,082 | Wald | May 16, 1950 |